United States Patent
Xiao et al.

(10) Patent No.: US 10,024,226 B2
(45) Date of Patent: Jul. 17, 2018

(54) METHOD AND SYSTEM FOR BOOST PRESSURE CONTROL

(71) Applicant: Ford Global Technologies, LLC, Dearborn, MI (US)

(72) Inventors: Baitao Xiao, Canton, MI (US); Hamid-Reza Ossareh, Livonia, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 15/160,880

(22) Filed: May 20, 2016

(65) Prior Publication Data

US 2017/0335754 A1    Nov. 23, 2017

(51) Int. Cl.

| F02B 37/04 | (2006.01) |
|---|---|
| F02D 41/10 | (2006.01) |
| F02D 11/10 | (2006.01) |
| F02B 37/12 | (2006.01) |
| F02B 37/14 | (2006.01) |
| F02B 37/16 | (2006.01) |
| F02B 37/18 | (2006.01) |
| F02B 39/10 | (2006.01) |
| F02D 41/00 | (2006.01) |
| F02B 39/16 | (2006.01) |

(52) U.S. Cl.
CPC ............ *F02B 37/04* (2013.01); *F02B 37/127* (2013.01); *F02B 37/14* (2013.01); *F02B 37/16* (2013.01); *F02B 37/18* (2013.01); *F02B 39/10* (2013.01); *F02D 41/0007* (2013.01); *F02D 41/10* (2013.01); *F02B 2037/122* (2013.01); *F02B 2039/168* (2013.01); *F02D 11/10* (2013.01); *F02D 2200/0406* (2013.01)

(58) Field of Classification Search
CPC ........ F02B 37/10; F02B 37/127; F02B 39/10; F02B 37/14; F02B 37/04; F02B 37/16; F02B 37/18; F02B 2039/168; F02B 2037/122; F02D 41/0007
USPC ........................................ 60/600, 602, 605.2
See application file for complete search history.

(56) References Cited

U.S. PATENT DOCUMENTS

| 6,938,420 | B2 | 9/2005 | Kawamura et al. |
|---|---|---|---|
| 7,210,296 | B2 | 5/2007 | Bolz et al. |
| 7,530,229 | B2 | 5/2009 | Akita |
| 7,628,015 | B2 | 12/2009 | Marumoto et al. |
| 7,926,270 | B2 * | 4/2011 | Weaver ................. F02B 37/186 123/562 |

(Continued)

OTHER PUBLICATIONS

Xiao, Baitao et al., "Methods and Systems for Boost Control," U.S. Appl. No. 14/799,342, filed Jul. 14, 2015, 35 pages.

(Continued)

*Primary Examiner* — Hoang Nguyen
(74) *Attorney, Agent, or Firm* — Julia Voutyras; McCoy Russell LLP

(57) ABSTRACT

Methods and systems are provided for controlling boost pressure in a staged engine system comprising a turbocharger and an upstream electric supercharger. In one example, a method may include coordinating the operation of the electric supercharger and an electric supercharger bypass valve and to open the electric supercharger bypass valve to reduce the extent and duration of electric supercharger overboost.

20 Claims, 5 Drawing Sheets

(56) References Cited

U.S. PATENT DOCUMENTS

| | | | |
|---|---|---|---|
| 7,958,727 B2 | 6/2011 | Arnold | |
| 7,958,730 B2 | 6/2011 | Stewart | |
| 8,164,208 B2 | 4/2012 | Rosson et al. | |
| 8,176,735 B2 | 5/2012 | Komatsu | |
| 8,220,245 B1 | 7/2012 | Papandreas | |
| 9,435,300 B2 * | 9/2016 | Pursifull | F02M 35/10229 |
| 9,695,740 B2 * | 7/2017 | Xiao | F02B 37/14 |
| 2012/0210711 A1 * | 8/2012 | Petrovic | F02B 37/013 60/602 |
| 2012/0271529 A1 * | 10/2012 | Kashiwagi | F02B 37/12 701/102 |
| 2013/0006494 A1 * | 1/2013 | Petrovic | F02D 41/024 701/102 |
| 2014/0053547 A1 * | 2/2014 | Wade | F02B 37/04 60/599 |
| 2014/0127002 A1 | 5/2014 | Joergl et al. | |
| 2014/0260241 A1 | 9/2014 | Jankovic et al. | |
| 2015/0027407 A1 | 1/2015 | Darnell | |
| 2015/0047617 A1 | 2/2015 | Benjey et al. | |

OTHER PUBLICATIONS

Xiao, Baitao et al., "Methods and Systems for Boost Control," U.S. Appl. No. 14/942,487, filed Nov. 16, 2015, 38 pages.
Xiao, Baitao et al., "Method and System for Boost Pressure Control," U.S. Appl. No. 15/160,842, filed May 20, 2016, 49 pages.
Xiao, Baitao et al., "Method and System for Boost Pressure Control," U.S. Appl. No. 15/160,927, filed May 20, 2016, 44 pages.

\* cited by examiner

METHOD AND SYSTEM FOR BOOST PRESSURE CONTROL

FIELD

The present description relates generally to methods and systems for regulating engine boost pressure in staged boosted engine systems.

BACKGROUND/SUMMARY

Engines may be operated using boosting devices, such as turbochargers or superchargers, to increase mass airflow into a combustion chamber. Turbochargers and superchargers compress intake air entering the engine using an intake compressor. Further, one or more intake charging devices may be staged in series or parallel to improve engine boost response.

One example of a multi-staged boosted engine is shown by Kawamura et al. in U.S. Pat. No. 6,938,420. Therein, an electric supercharger driven by an electric motor and an electric supercharger bypass valve (ESBPV) are staged downstream of a turbocharger. During conditions when the turbocharger compressor is not spun up, the ESBPV may be closed and the electric supercharger may be rotated to provide a transient positive boost pressure in order to reduce turbo lag. Then, when the turbocharger compressor is sufficiently spun up, the ESBPV may be opened and the electric supercharger may be disabled, allowing the turbocharger to provide the desired boost pressure.

However, the inventors herein have recognized potential issues with such systems. As one example, if the electric supercharger is operated aggressively to reduce turbo lag, electric boost overshoot may occur, which may be difficult to control. In particular, due to hardware constraints, it may not be possible to brake the electric motor and provide negative torque to slow down the electric supercharger shaft speed responsive to an electric boost overshoot. Instead, the motor may be disabled enabling the high electric supercharger speeds to be reduced using natural decay including resistive effects of friction and air resistance. However, in the meantime, the actual boost pressure may continue to overshoot resulting in excessive engine torque output. During this time, the engine intake throttle may not have the bandwidth to react to the fast pressure build-up. Consequently, any throttle adjustments may result in actual manifold pressure overshooting the desired manifold pressure, further contributing to the boost overshoot. To leverage the natural decay of the supercharger speed to address the boost overshoot, the electric supercharger disabling may need to be commanded before the desired boost pressure or target torque is reached. However this increases the time to torque and results in a boost lag even with the electric supercharger operating. As such, the excess boost and excess torque can result in drivability issues.

In one example, the issues described above may be addressed by a method for a boosted engine, comprising: while a downstream compressor spins up, accelerating an upstream compressor with a bypass valve coupled in a bypass across the first compressor closed to provide a flow of compressed air to a piston engine and, in response to a boost pressure overshoot, opening the bypass valve. In this way, boost pressure overshoot may be more accurately controlled while expediting a time to torque.

As one example, an electric supercharger (ES) including a compressor driven by an electric motor may be staged upstream of a turbocharger (TC) including a compressor driven by an exhaust turbine. An electric supercharger bypass valve (ESBPV) may be coupled in a bypass around the ES. To reduce turbo lag, while the turbocharger compressor spins up, the ESBPV may be closed while the electric supercharger is transiently operated via the electric motor to provide positive pressure. In response to a boost pressure overshoot experienced downstream of the ES compressor while the TC compressor is still spinning up (that is, an electric boost overshoot condition), the ESBPV may be transiently opened to rapidly bleed down the electric boost pressure provided by the electric supercharger. In addition, the electric supercharger may be concurrently disabled and decelerated. Further, the supercharger adjustments may be provided in the complementary frequency band as adjustments to a wastegate coupled to the exhaust turbine of the TC, allowing for a faster and more accurate regulation of the TC compressor speed. In particular, the wastegate control loop may be tuned more aggressively since the fast dynamics of the ESBPV would be able to damp any oscillations and reduce the boost pressure overshoot.

In this way, airflow through an electric supercharger compressor can be substantially immediately limited, allowing for expedited electric boost overshoot control. The technical effect of opening a bypass valve around the electric supercharger while a downstream turbocharger spins up is that boosted airflow to the engine can be more rapidly reduced to a level desired based on driver demand. This enables boosted air pressure to be regulated more quickly, and excess engine torque delivery to be reduced. By concurrently decelerating the supercharger, the boost pressure may not be affected by delays incurred in supercharger speed decay. In addition, if there is a sudden operator change of mind while the turbocharger is spinning up, the ESBPV can be closed and the ES accelerated to rapidly meet the driver demand without degrading the time to torque. Further, the ES and ESBPV adjustments may be provided in coordination with throttle adjustments and in the complementary frequency band as wastegate adjustments, allowing for a faster and more accurate regulation of the boost pressure. Further, the wastegate control loop may be tuned more aggressively.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
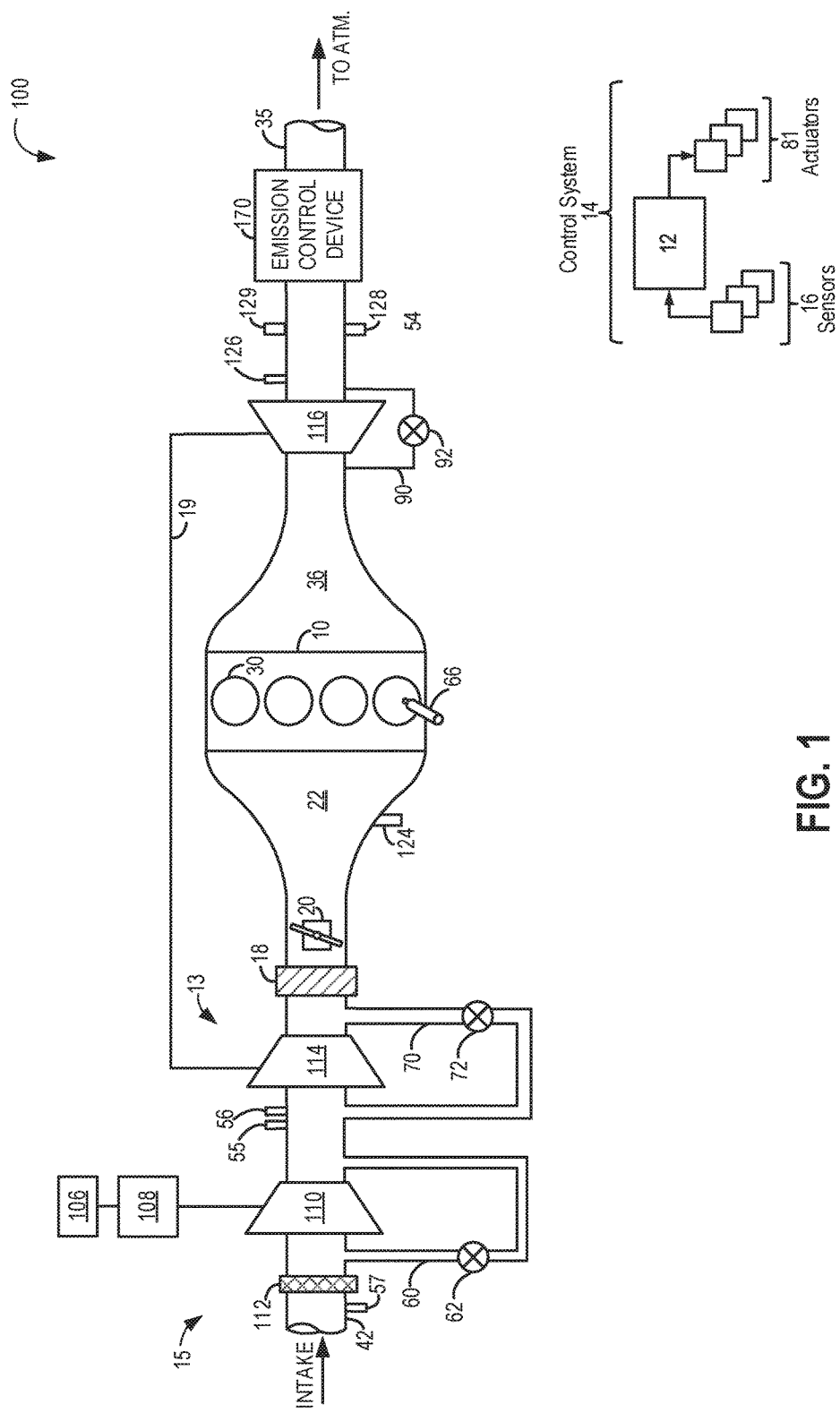
FIG. 1 shows an example embodiment of a boosted engine system having multiple staged charge boosting devices.

The following description relates to systems and methods for improving boost control in an engine system having staged boosting devices, such as in the boosted engine system of FIG. 1, wherein a turbocharger is staged downstream of an electric supercharger. A controller may be configured to perform a routine, such as the example routines of FIGS. 2-3, to use the electric supercharger to reduce turbo lag while regulating boost pressure overshoot using adjustments to a rotation speed of the supercharger motor and the opening of a bypass valve coupled across the supercharger. These adjustments may be used in a complementary frequency to boost pressure controlling wastegate valve adjustments. During conditions of boost pressure overshoot downstream of the turbocharger, the electric supercharger compressor speed may be controlled to choke airflow through the turbocharger, the supercharger speed adjusted based on a compressor map, such as the map of FIG. 4. An example boost control operation coordinating adjustments across the supercharger and the turbocharger is shown with reference to FIG. 5. In this way, boost pressure overshoot may be controlled more effectively.

FIG. 1 schematically shows aspects of an example engine system 100 including an engine 10. In the depicted embodiment, engine 10 is a boosted engine including multiple, staged boosting devices. Specifically, engine 10 includes a first boosting device 15 staged upstream of a second boosting device 13. The configuration results in a second compressor 114 (of the second boosting device) being positioned in the engine intake passage 42 downstream of a first compressor 110. In the present example, the second boosting device is a turbocharger 13, while the first boosting device is an electric supercharger 15. The downstream turbocharger 13 may be capable of producing a higher boost pressure than supercharger 15. Herein, the downstream compressor is larger than the upstream compressor (for example, the downstream turbocharger compressor may have larger inertia, larger flow area, et., and therefore may be able to provide a larger amount of boosted pressure for a longer duration as compared to the upstream compressor of the supercharger.

Electric supercharger 15 includes first compressor 110 driven by electric motor 108. The electric motor 108 is operated at a motor speed based on a desired boost pressure. The first compressor 110 may be decelerated by reducing the motor speed of the electric motor 108. Motor 108 is powered by an on-board energy storage device, such as system battery 106. The second compressor 114 is driven by an exhaust turbine 116. Fresh air is introduced along intake passage 42 into engine 10 via air cleaner 112 and flows to the first compressor 110. Air compressed by first compressor 110 is then delivered to the second compressor 114. During selected conditions, as elaborated below, air may bypass supercharger 15 and be directed to turbocharger 13 through first compressor bypass 60 by adjusting the opening of an electric supercharger bypass valve (ESBPV) 62.

Turbocharger 13 includes second compressor 114 driven by an exhaust turbine 116.

Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions. Fresh air received at the compressor inlet of second compressor 114 is introduced into engine 10. Air compressed by turbocharger 13 may be recirculated from the outlet to the inlet of compressor 114 through second compressor bypass 70 by adjusting the opening of a compressor recirculation valve (CRV) 72. CRV 72 may be a continuously variable valve and increasing the opening of the recirculation valve may include actuating (or energizing) a solenoid of the valve.

As shown in FIG. 1, second compressor 114 is coupled, through charge-air cooler (CAC) 18 (herein also referred to as an intercooler) to throttle valve 20. Throttle valve 20 is coupled to engine intake manifold 22. From the second compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

It will be appreciated that, as used herein, first compressor refers to the upstream of the staged compressors and second compressor refers to the downstream of the staged compressors. In one non-limiting example, as depicted, the second downstream compressor is a turbocharger compressor while the first upstream compressor is a supercharger compressor. However, other combinations and configurations of boosting devices may be possible.

During selected conditions, such as during a tip-in, when going from engine operation without boost to engine operation with boost, turbo lag can occur. This is due to delays in turbine spin-up of the second compressor 114. To reduce this turbo lag, during those selected conditions, both supercharger 15 and turbocharger 13 may be enabled. Specifically, while turbine 116 spins-up, boost pressure can be provided by the upstream supercharger compressor 110. Enabling the supercharger includes drawing energy from battery 106 to spin motor 108, to thereby accelerate first compressor 110. In addition, bypass valve 62 may be closed so as to enable a larger portion of air to be compressed by first compressor 110. Due to its smaller size, and the limited charge of the system battery, first compressor 110 can be rapidly spun up and rotated for a short duration, enabling a transient positive boost pressure to be provided in response to a sudden increase in boost demand. Then, when the turbine has sufficiently spun up, and is capable of driving second compressor 114, the first compressor may be decelerated by disabling motor 108. In addition, bypass valve 62 may be opened so as to enable a larger portion of air to bypass first compressor 110. As elaborated herein, by coordinating the opening of ESBV 62 with adjustments to the motor speed, electric boost overshoot downstream of the first compressor and upstream of the second compressor can be addressed.

Figure 4:
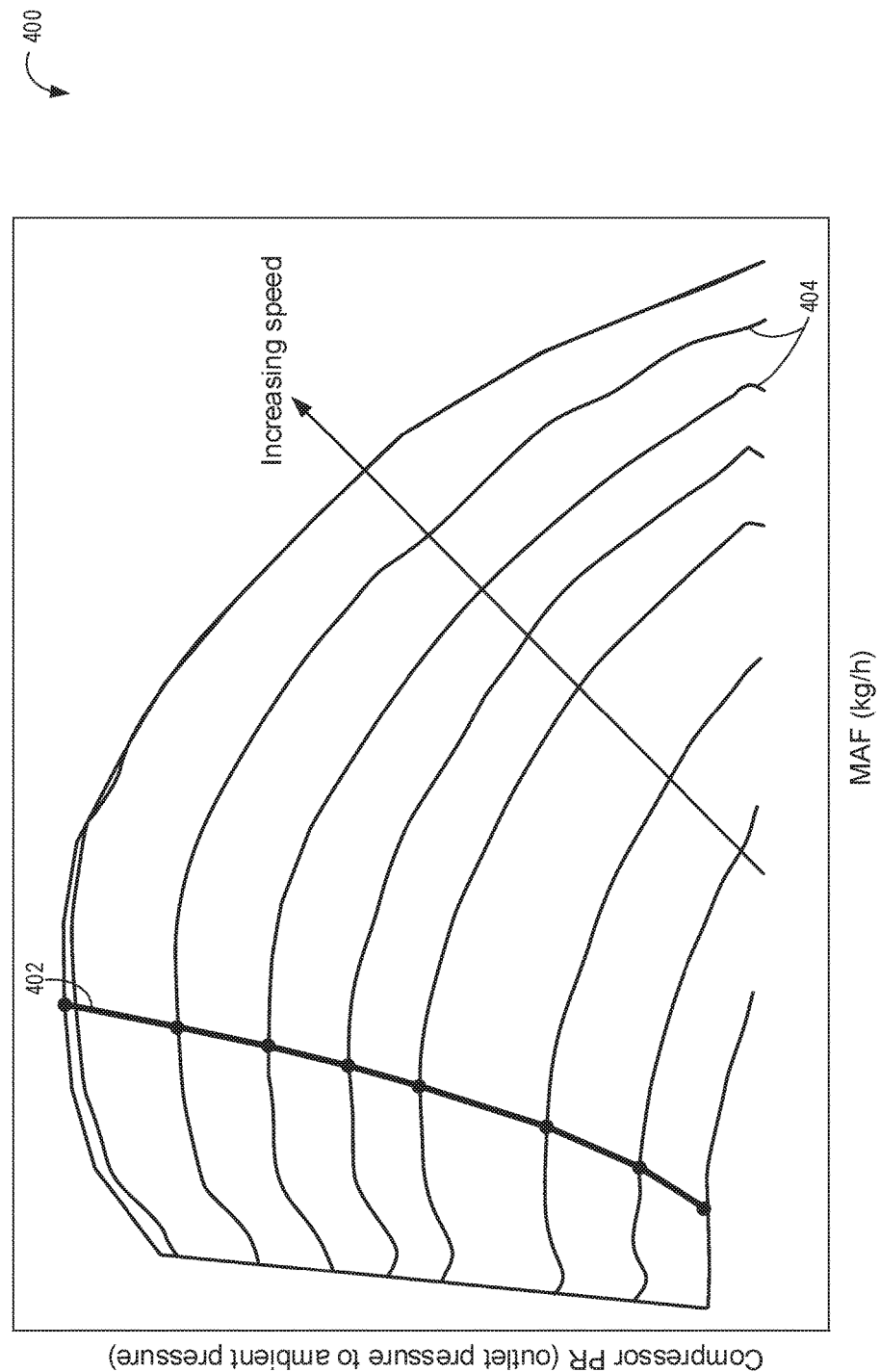
FIG. 4 shows a compressor map of the compressor pressure ratio over the mass airflow.

During selected conditions, such as during a tip-in from a boosted engine operation to a higher boosted engine operation, boost pressure overshoot downstream of the turbocharger compressor (herein also referred to as turbocharger overshoot) may occur. Turbocharger overshoot includes a higher than desired throttle inlet pressure due to the turbocharger compressor 114 spinning faster than desired and may lead to engine torque over-delivery. As elaborated herein, to mitigate turbocharger overshoot, the first compressor 110 may be accelerated to a speed corresponding to a desired choke flow of aircharge through the second compressor, as determined based on compressor map (FIG. 4). In addition, the ESBPV 62 may be closed. This allows throttle inlet pressure to be substantially immediately reduced to a desired pressure.

The second compressor 114 may also be decelerated by increasing the opening of wastegate 90 by opening wastegate valve 92 via a wastegate actuator to allow exhaust air to bypass turbine 116. During operation of the first compressor 110, the turbocharger wastegate 90 may be actuated with a higher than default gain tuning. The faster electric supercharger speed adjustments may reduce turbocharger 13 boost error more quickly than by actuation of the turbocharger wastegate 90, so the wastegate 90 may be tuned more aggressively during electric supercharger 15 operation.

In some embodiments, ESBPV 62 may be normally partially open during operation of the first compressor 110. In response to overshoot of the electric supercharger, the ESBPV 62 opening may be increased, resulting in a substantially immediate reduction in boost pressure provided by the electric supercharger. For example, the valve may be shifted from the default, partially open position towards a fully open position. A degree of opening of the valve during those conditions may be based on the error of electric supercharger boost pressure delivery. The ESBPV 62 may be held closed while the electric supercharger is disabled.

One or both of valves 62 and 72 may be continuously variable valves wherein a position of the valve is continuously variable from a fully closed position to a fully open position. Alternatively, compressor recirculation valve 72 may be a continuously variable valve while compressor bypass valve 62 is an on-off valve.

One or more sensors may be coupled to an inlet of second compressor 114 (as shown) and/or first compressor 110 (not shown). For example, a temperature sensor 55 may be coupled to the inlet for estimating a compressor inlet temperature. As another example, a pressure sensor 56 may be coupled to the inlet for estimating a pressure of aircharge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC. One or more sensors may also be coupled to intake passage 42, upstream of compressor 114 and compressor 110, for determining a composition and condition of aircharge entering the compressor. These sensors may include, for example, manifold air flow sensor 57.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, bypassing the turbine. Wastegate valve 92 may be actuated open to dump at least some exhaust pressure from upstream of the turbine to a location downstream of the turbine via wastegate 90. Turbine speed may also be reduced by reducing exhaust pressure upstream of the turbine. Likewise, during turbo-lag the turbine speed may be increased by increasing exhaust pressure upstream of the turbine, as by enabling an upstream electric supercharger while maintaining the turbocharger wastegate closed. Therefore, during turbo-lag, the electric supercharger may be used to provide the desired boost pressure as the turbocharger accelerates while simultaneously increasing the rate at which the turbocharger accelerates by increasing the exhaust pressure upstream of the turbine.

The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of first compressor 110, second compressor 114, or both.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, and MAF sensor 57. Other sensors such as additional pressure, temperature, air/fuel ratio, and composition sensors may be coupled to various locations in engine system 100. The actuators 81 may include, for example, actuators for throttle 20, compressor recirculation valve 72, ESBPV 62, electric motor 108, wastegate valve 92, and fuel injector 66. The control system 14 may include a controller 12. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIGS. 2-3.

As one example, the controller 12 may contain computer readable instructions stored on non-transitory memory to, in response to an operator pedal tip-in, flow compressed air to the engine by operating the first compressor 110 and each of the bypass valve 62 and the wastegate valve 90 closed until the speed of turbine 116d is higher than a threshold turbine speed and, in response to a boost pressure overshoot while operating the first compressor 110, intermittently open the bypass valve 62 while maintaining the wastegate valve 90 closed. The controller 12 may also contain computer readable instructions stored on non-transitory memory to, in response to an operator pedal tip-in from boosted engine operation while the second compressor 114 is spinning, close wastegate valve 90 to adjust a speed of the second compressor 114, and adjust a speed of the first compressor 110 to limit airflow into the second compressor 114.

In this way, the components of FIG. 1 enable an example engine system comprising an engine having an intake; a first intake compressor driven by an electric motor, the motor powered by a battery; a second intake compressor driven by an exhaust turbine, the second compressor positioned downstream of the first compressor along the intake; a bypass including a bypass valve coupled across the first compressor; a wastegate including a wastegate valve coupled across the exhaust turbine; a compressor recirculation valve coupled across the downstream compressor, and a controller. The controller may be configured with computer readable instructions stored on non-transitory memory for: in response to an operator pedal tip-in, flowing compressed air to the engine by operating the first compressor and each of the bypass valve and the wastegate valve closed (and the recirculation valve closed) until a turbine speed is higher than a threshold turbine speed; and in response to a boost pressure overshoot while operating the first compressor, intermittently opening the bypass valve while maintaining the wastegate valve (and the recirculation valve) closed. The controller may include further instructions for: flowing compressed air to the engine by operating the second compressor while bypassing the second compressor with the bypass valve closed and the wastegate valve partially open after the turbine speed is higher than the threshold turbine speed; and in response to a boost pressure overshoot while operating the second compressor, intermittently increasing an opening of the wastegate valve (and/or the recirculation valve) while maintaining the bypass valve closed. The controller may include further instructions for actuating the wastegate valve with a higher than default tuning when the bypass valve is not degraded, and in response to an indication of bypass valve degradation, actuating the wastegate valve with the default tuning.

The components of FIG. 1 may also enable another example engine system wherein the controller is configured with computer readable instructions stored on non-transitory memory for: in response to an operator pedal tip-in while the second compressor is spinning, closing the wastegate valve to adjust a speed of the second compressor; and concurrently adjusting a speed of the first compressor to limit airflow into the second compressor. A degree of closing of the wastegate valve and a rotation speed of the first compressor may be adjusted to provide a target pressure ratio at the second compressor, the target pressure ratio based on driver demand. The controller may include further instructions for: after the target pressure ratio is reached, decelerating the first compressor while increasing an opening of the wastegate valve (and/or the recirculation valve). The controller may include further instructions for: in response to an operator pedal tip-in while the second compressor is not spinning, closing the wastegate valve (and/or the recirculation valve) to increase the speed of the second compressor; and concurrently increasing the speed of the first compressor to increase airflow through the second compressor while increasing an opening of the bypass valve based on a boost error.

Figure 2:
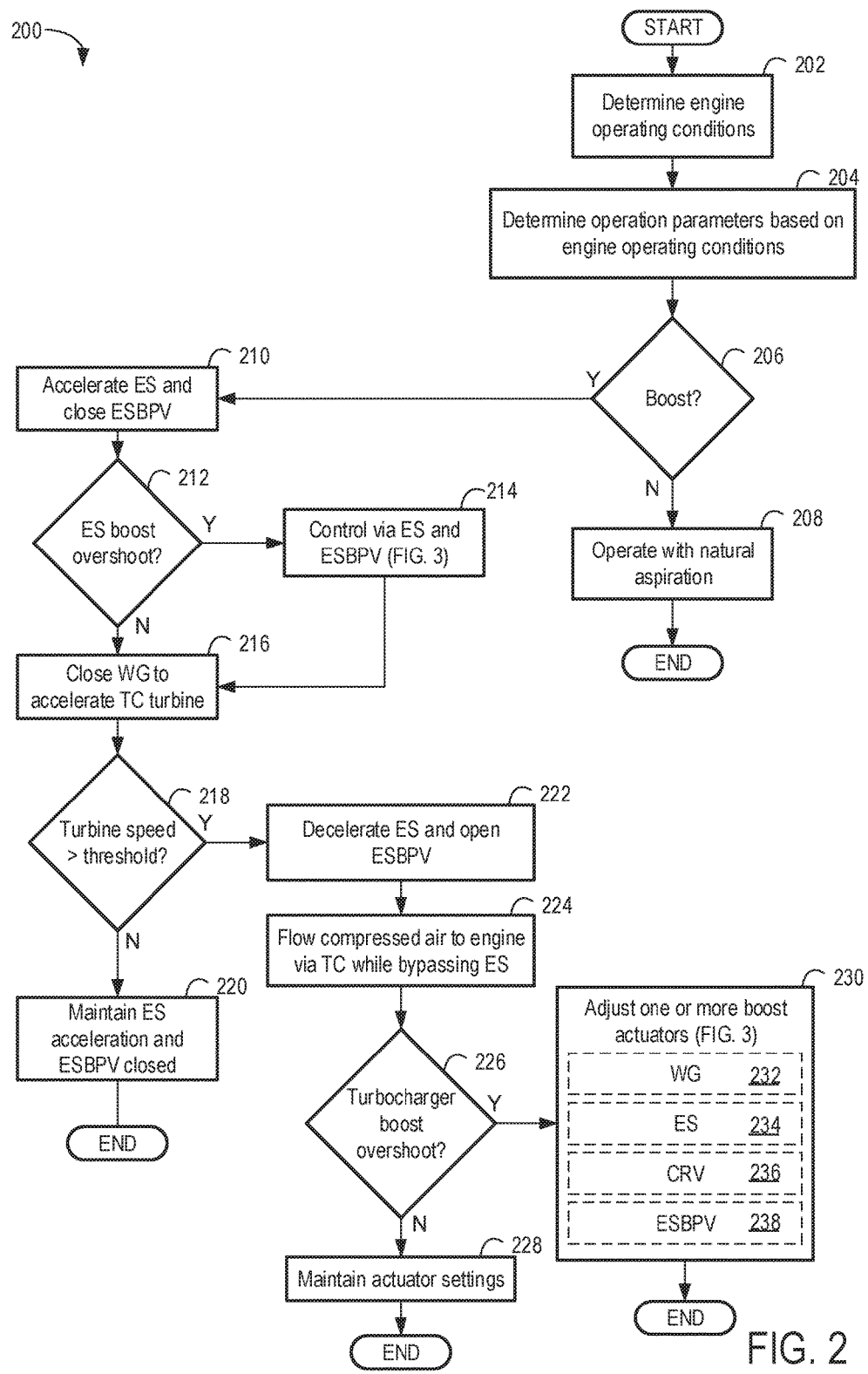
FIG. 2 shows a high level flowchart illustrating a routine that may be implemented to regulate engine boost pressure in an engine system containing an electric supercharger and a turbocharger.

FIG. 2 shows an example routine 200 for operating a compressor of an upstream boosting device (e.g., supercharger) and a downstream boosting device (e.g., turbocharger) in response to changes in engine boost demand. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. Herein the engine system contains a first compressor staged upstream of a second compressor along an air intake passage. Further, the first compressor is driven by an electric motor while the second compressor is driven by an exhaust turbine. In one example, as shown with reference to FIG. 1, the first compressor is a supercharger compressor while the second compressor is a turbocharger compressor.

At 202, the method includes determining engine operating conditions, such as engine speed, pedal position, operator torque demand, ambient conditions (ambient temperature, pressure, humidity), engine temperature, etc. At 204, operation parameters are determined based on engine operating conditions. These may include, for example, EGR levels, desired boost pressure, spark ignition timing, wastegate opening, throttle opening, etc. At 206, the method includes determining if boost is required. In one example, boost may be required at mid-high engine loads. In another example, boost may be required in response to an operator pedal tip-in or increase in driver torque demand.

If boost is not required, such as when the engine load is low or the driver torque demand is low, the method moves to 208 wherein the engine is operated with natural aspiration and the method ends.

If boost is required, then at 210, the method includes enabling the first upstream compressor and closing a bypass valve (the electric supercharger bypass valve, or ESBV) of a bypass coupled across the first upstream compressor. The electric supercharger is used to provide transient boost pressure at tip-in to reduce the turbo-lag caused by the slow acceleration of the turbocharger compressor. Due to its smaller size, the electric supercharger may be quickly accelerated to provide a desired boost pressure until the turbocharger is able to provide the desired boost pressure. Use of the electric supercharger may be limited by the capacity of the battery used to spin the electric motor of the electric supercharger. Therefore, the electric supercharger may be used to provide a quick but transient amount of positive boost pressure while the turbocharger turbine spins up and can drive the larger turbocharger compressor.

Thus, in response to an increase in driver demanded torque, the first compressor is accelerated and the flow of compressed air to the engine is increased. Herein, accelerating the first compressor includes spinning the first compressor via the electric motor using power drawn from a battery. For example, the first compressor may be spun by adjusting an electromechanical actuator coupled to an electric motor of the supercharger to rotate the motor at a higher speed by sending a control signal from the controller to the actuator. The first compressor is accelerated at a speed responsive to an increase in boost demand and an ESBPV coupled across the electric supercharger is held closed to flow all the intake air through the first compressor. Thus, compressed air is provided to the engine via the first compressor. At this time, boost demand may be met via the supercharger compressor alone.

At 212, it is determined if there is an electric supercharger boost overshoot. That is, it is determined if the boost pressure downstream of the electric supercharger and upstream of the turbocharger compressor is higher than a desired boost pressure. If not, while continuing to provide boost via the electric supercharger, a wastegate coupled across the exhaust turbine of the turbocharger is closed (or the opening is reduced) to drive a larger portion of exhaust air through the turbocharger turbine at 216, thereby expediting turbine spin-up.

The inventors herein have recognized that aggressive use of the electric supercharger can be advantageously used to reduce time to torque and turbo lag. However, the same aggressive use can also cause the actual boost pressure to overshoot the desired boost pressure. This overshoot can be addressed using adjustments to the ESBV opening. If the electric supercharger boost pressure is higher than the desired pressure, and there is electric supercharger boost overshoot, electric supercharger boost pressure is controlled by adjusting the speed (e.g., decelerating) the electric supercharger and increasing the opening of the ESBV simultaneously at 214, further described in FIG. 3. In one example, the ESBV is transiently moved to a fully open position to reduce the boost overshoot. In an alternate example, the ESBV is partially opened. As such, due to hardware limitations, it may not be possible to brake the electric motor coupled to the supercharger. Therefore, by increasing the ESBPV opening responsive to the boost pressure overshoot, airflow through the electric supercharger compressor can be quickly reduced, enabling the boost pressure provided by the electric supercharger to be substantially immediately reduced. While the ESBPV is opened to lower the electric supercharger boost pressure to the desired boost pressure, the electric supercharger may also be decelerated, for example to a compressor speed capable of providing the desired boost pressure without less overshoot. In this way, using a combination of adjustments to the electric supercharger compressor speed and the ESBV opening, a target boost pressure can be reached faster and with fewer boost errors.

In an alternate example, where the electric supercharger includes hardware for braking, the first compressor may be decelerated responsive to the boost overshoot by applying a negative torque through the electric motor, such as by using magnetic brakes. From 214, the method moves to 216 wherein the turbocharger wastegate is held closed and the turbocharger turbine is accelerated.

At 218, it is determined whether the turbocharger turbine speed is greater than a threshold speed such as above a threshold speed where the turbocharger is able to sustain the boost demand. If not, then while the turbine continues to spin up, operation of the first compressor (of the supercharger) is maintained at 220, with the electric supercharger compressor continuing to meet the boost demand. In addition, the ESBPV is closed (for example, fully closed), and the routine ends.

If the turbocharger turbine speed is above the threshold speed, then at 222, the electric supercharger is decelerated and the opening of the ESBPV is increased. In one example, the ESBV is moved to a fully open position so that intake airflow can be directed to the turbocharger compressor while bypassing the supercharger compressor. As the turbocharger is able to sustain the boost demand, the electric supercharger may be disabled, so as to avoid draining the electric supercharger battery. By opening the ESBPV, the electric supercharger may be bypassed, allowing the electric supercharger to decelerate without restricting airflow through the intake pathway.

At 224, the method includes flowing intake air compressed by the second, downstream compressor (the turbocharger compressor) into the engine while bypassing the first, upstream compressor (the supercharger compressor). At this time, boost demand may be met via the turbocharger compressor alone.

At 226, it is determined if the boost pressure provided by the turbocharger is higher than a demanded boost pressure (that is, if there is turbocharger boost overshoot). If not boost actuator settings are maintained at 228 and the method ends. If there is boost pressure overshoot downstream of the turbocharger compressor, one or more of the boost actuators may be adjusted at 230, according to methods further outlined in FIG. 3. The actuators may include, an exhaust wastegate 232, the electric supercharger 234, a compressor recirculation valve 236, and an electric supercharger bypass valve 238. As elaborated at FIG. 3, boost pressure may be reduced via adjustments to one or more of a wastegate valve (coupled across the exhaust turbine), and a compressor recirculation valve (coupled across the turbocharger compressor). In addition, boost pressure overshoot may be addressed by reducing turbocharger compressor flow via adjustments to the ESBV coupled across the supercharger compressor, and the supercharger compressor speed (via adjustments to the corresponding electric motor).

Figure 3:
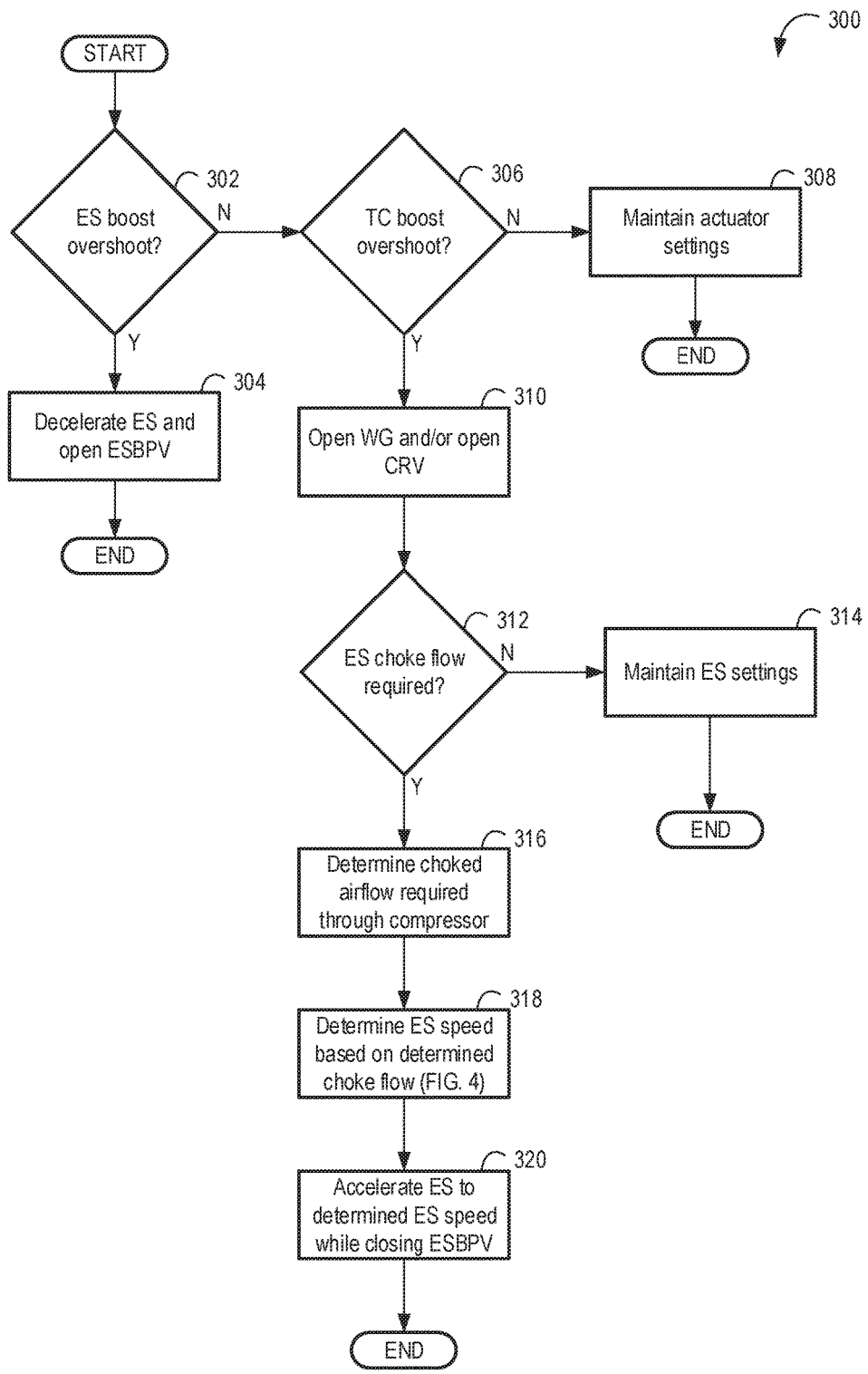
FIG. 3 shows a flowchart illustrating a routine that may be implemented to regulate boost overshoot of an electric supercharger or a turbocharger.

FIG. 3 shows an example routine 300 for addressing boost pressure overshoot in a multi-staged boosted engine system. The method uses adjustments at the upstream compressor to reduce boost pressure overshoot both at the upstream compressor as well as the downstream compressor. In one example, the routine of FIG. 3 may be performed as part of the routine of FIG. 2, such as at step 214 and/or 230.

At 302, electric boost overshoot conditions are confirmed. Herein, it may be determined if a boost pressure being provided by the upstream electric supercharger compressor exceeds a desired boost pressure. As such, the electric supercharger may be used to provide the demanded boost pressure while a downstream turbocharger turbine spins up. In one example, boost pressure overshoot at the electric supercharger may be determined based on a boost pressure estimated downstream of the first compressor and upstream of the second compressor relative to the demanded boost pressure.

If boost pressure overshoot at the electric supercharger is confirmed, then at 304, the electric supercharger is decelerated and the ESBPV opening is increased concurrently and the routine ends. Increasing the opening of the ESBV includes moving the ESBV from a current bypass valve position based on the desired boost pressure (which may be fully open). In addition, each of a degree and a duration of increasing the opening of the bypass valve may be based on the boost error. Therein, as the boost error (the amount of overshoot relative to the demanded boost pressure) increases, the degree of opening may be increased and/or the duration of opening may be increased. In one example, the ESBV is immediately transitioned to a fully open position (from the fully closed position). Increasing the ESBPV opening may allow airflow to bypass the first compressor, resulting in a substantially immediate reduction in boost pressure. Meanwhile, the electric supercharger may be decelerated, such as to a revised compressor speed based on the desired boost pressure. The electric supercharger may be decelerated by adjusting the electric motor speed from a first motor speed based on desired boost pressure to a second motor speed based on the boost error. Then when the overshoot condition has subsides, the ESBV opening may be reduced (e.g., the ESBV may resume a fully closed position) and the supercharger compressor may be accelerated, if required.

As such, if the boost pressure overshoot were addressed by only decelerating or disabling the electric motor coupled to the supercharger, the electric supercharger speed would be reduced using natural decay including resistive effects of friction and air resistance. However, in the meantime, the actual boost pressure would continue to overshoot resulting in excessive engine torque output. During this time, the engine intake throttle may not have the bandwidth to react to the fast pressure build-up. Consequently, any throttle adjustments would result in actual manifold pressure overshooting the desired manifold pressure, further contributing to the boost overshoot. To leverage the natural decay of the supercharger speed to address the boost overshoot, the controller may need to disable the electric supercharger even before the desired boost pressure or target torque was reached. However this would increase the time to torque and result in a boost lag even with the electric supercharger operating. In other words, if the ESBPV were not opened and only the supercharger compressor were decelerated (by decelerating the corresponding motor), the resulting drop in boost pressure would not be fast enough and the boost overshoot condition would be prolonged. In this way, regulation of the ESBPV opening responsive to boost error may allow for more accurate control of electric supercharger boost pressure.

Additionally or optionally, while opening the ESBPV, an engine throttle angle may be decreased to reduce the throttle inlet pressure. However, in other examples, the intake throttle may be held fully open during the boost control to avoid confounding the wastegate control loop. Also during the electric boost overshoot, each of the wastegate valve and the CRV may be maintained in a closed or partially open position.

In this way, while a downstream compressor spins up, a controller may accelerate an upstream compressor with a bypass valve coupled in a bypass across the first compressor closed to provide a flow of compressed air to a piston engine; and in response to a boost pressure overshoot, open the bypass valve. Herein, the downstream compressor is larger than the upstream compressor (for example, the downstream turbocharger compressor may have larger inertia, larger flow area, etc. (inventors: please confirm/edit). Accelerating the upstream compressor includes operating an electric motor at a motor speed based on the desired boost pressure. Opening the bypass valve responsive to the boost pressure overshoot may include transiently opening the bypass valve from a fully closed position, each of a degree of opening of the bypass valve and a duration of opening of the bypass valve based on the boost pressure overshoot, the boost pressure overshoot occurring downstream of the downstream compressor, the boost pressure overshoot including actual boost pressure exceeding a desired boost pressure. In addition, intake throttle open is maintained open while the ESBV is opened. One or more of the degree of opening of the bypass valve and the duration of opening of the bypass valve is increased as the actual boost pressure exceeds the desired boost pressure, the bypass valve closed when the actual boost pressure is at the desired boost pressure. In response to the boost pressure overshoot while flowing compressed air via the upstream compressor, and while the downstream compressor spins up, the controller may decelerate the upstream compressor by reducing the motor speed of the electric motor. In response to a rotation speed of the exhaust turbine being higher than a threshold speed, the upstream compressor may be decelerated, the bypass valve opened, and compressed air may be flowed to the piston engine via the downstream compressor while bypassing the upstream compressor. Returning to FIG. 3, if boost pressure overshoot at the electric supercharger is not confirmed, the routine determines if there is boost pressure overshoot at the downstream turbocharger at 306. As such, it will be appreciated that boost pressure overshoot is experienced at the upstream electric supercharger compressor and the downstream turbocharger compressor at distinct, non-overlapping times of boost engine operation. In particular, boost pressure overshoot at the electric supercharger may be experienced during lower airflow conditions when the electric supercharger is being used to meet the driver demand and when the turbocharger compressor is not compressing intake air. In comparison, boost pressure overshoot at the turbocharger may be experienced during higher airflow conditions when the turbocharger is being used to meet the driver demand and when the supercharger compressor is not compressing intake air.

Confirming turbocharger boost pressure overshoot includes determining if a boost pressure being provided by the downstream turbocharger compressor exceeds a desired boost pressure. In one example, boost pressure overshoot at the electric supercharger may be determined based on a boost pressure estimated downstream of the second compressor relative to the demanded boost pressure. The boost pressure may also overshoot if the turbocharger turbine speed is above a threshold, and the airflow through the turbocharger compressor is above a threshold flowrate. If the turbocharger is not providing excessive boost pressure, then at 308, boost actuator settings may be maintained and the routine ends.

If boost pressure overshoot at the turbocharger is confirmed, at 310, the opening of one or more of an exhaust wastegate and a compressor recirculation valve (CRV) may be increased. In one example, one or both of the wastegate and the CRV may be moved to a fully open position.

By opening the exhaust wastegate, exhaust flow through the turbine may be reduced, decelerating the exhaust turbine and subsequently the turbocharger compressor. By opening the CRV, at least some of the air compressed by the turbocharger compressor may be recirculated to upstream of the compressor, resulting in substantially immediate reduction of throttle inlet pressure.

In one example, opening the exhaust wastegate valve includes adjusting a degree of opening of the wastegate valve responsive to the boost error with a higher than default gain tuning. Herein, the electric supercharger adjustments (including the opening of the ESBV and the use of a supercharger based choked airflow) may be provided in coordination with throttle adjustments and in the complementary frequency band as wastegate adjustments, allowing for a faster and more accurate regulation of the boost pressure. This allows the wastegate control loop to be tuned more aggressively since the fast dynamics of the electric supercharger is able to damp any oscillations resulting from the wastegate and reduce the boost pressure overshoot.

The wastegate may operate with the higher than default gain tuning during boost control and resume the default gain tuning in response to actual boost tracking according to the desired boost profile, or boost error being lower than a threshold (e.g., no boost error). Alternatively, the default gain tuning may be resumed in response to a system FMEM mode that may be triggered responsive to boosted engine component degradation. In one example, the wastegate may resume the default gain tuning in response to an indication of ESBV degradation.

However, due to relatively slow wastegate dynamics, the opening of the wastegate may result in a slower drop in the actual boost pressure, prolonging the overshoot condition. In addition, while the CRV adjustment may result in rapid drop in throttle inlet pressure, there may also be a larger drop in boost performance. As such, if the boost overshoot condition is due to an operator pedal tip-out event, relying on the wastegate and/or CRV adjustment alone can result in a slower time to torque if the operator tips-in soon after (such as due to a change of mind). Thus, as elaborated below, further engine boost control may be performed using electric supercharger based adjustments.

At 312, it may be determined whether electric supercharger based choke flow is required. In one example, choke flow may be required if the boost overshoot error is larger. In another example, choke flow may be required if the wastegate opening is limited due to other constraints. In yet another example, the controller may determine if choke flow can be provided based on a state of charge of a battery coupled to the electric motor of the supercharger compressor. In particular, choke flow may be enabled only if the battery state of charge is higher than a threshold. If electric supercharger choke flow is not required, electric supercharger settings are maintained, as at 314, and the routine ends.

The inventors herein have recognized that operating the electric supercharger at a given supercharger compressor speed may affect an amount of air flowing through the supercharger compressor into the downstream turbocharger compressor. This amount may be further affected by intake airflow levels. Thus, during lower (e.g., idling) airflow levels, operating the supercharger compressor can increase airflow through the supercharger compressor into the downstream turbocharger compressor. This is leveraged during conditions when the turbine is not sufficiently spun up to quickly accelerate the supercharger compressor and deliver boosted airflow to the engine. At higher airflow levels however, such as when the turbine is spun up and the engine is receiving boosted air via the turbocharger compressor, operating the supercharger compressor can decrease airflow through the supercharger compressor into the downstream turbocharger compressor. As a result, the airflow into the turbocharger compressor is limited, or choked, providing a substantially immediate reduction in boost pressure. By adjusting the supercharger compressor speed, via adjustments to the electric motor speed, airflow into the turbocharger compressor can be lowered, thereby controlling the boost pressure output by the turbocharger compressor. In other words, the supercharger compressor may be operated as a flow restrictor for the turbocharger compressor, and the choked flow into the turbocharger compressor can be used for boost pressure overshoot control. As such, this may be leveraged alongside wastegate adjustments, in complementary frequency bands, to enable a more accurate boost control.

If choke flow is required, then at 316, an amount of airflow (choke flow) to be provided through the electric supercharger compressor into the turbocharger compressor may be determined based on the boost pressure error. In one example, as the boost error increases (wherein the actual boost pressure overshoots the desired boost pressure), a lower airflow into the turbocharger compressor may be requested (that is, a lower absolute airflow level which results from a higher amount of choking of the airflow). In another example, the amount of airflow may be selected to provide a target pressure ratio across the downstream turbocharger compressor.

At 318, an electric supercharger compressor speed that corresponds to the desired amount of choke flow may be determined. As such, the supercharger compressor speed required for the desired choke flow may vary based on operating conditions including an intake throttle position and an intake airflow (e.g., manifold airflow levels). For example, at a given manifold airflow level, the airflow into the turbocharger compressor may be increased as the supercharger compressor speed increases. As such, the higher the supercharger compressor speed is, the higher the choke flow that will happen. As depicted at FIG. 4, choke flow at different compressor speeds are when constant speed line intercept with the X axis (or pressure ratio at 1). The air flow into the turbocharger compressor is decreased because the ESBV closed. Thereafter, the lower the supercharger speed, the lesser the flow that is allowed to pass. As another example, for a given supercharger compressor speed, a smaller airflow may be directed into the downstream turbocharger compressor as intake manifold airflow level increases. The controller may refer a compressor map, such as the example map of FIG. 4, to determine a target supercharger compressor speed corresponding to the target choke flow.

At 320, the electric supercharger may be accelerated to the target compressor speed determined at 318 to low the airflow of the downstream compressor to the target choke flow. Concurrently, the ESBPV may be closed (e.g., fully closed) to direct airflow through the electric supercharger compressor and to choke airflow into the turbocharger compressor, thereby reducing the boost pressure. The routine then ends. Herein the upstream compressor is accelerated while maintaining an intake throttle open until an airflow through the downstream compressor is below a threshold. Thereafter, the upstream compressor may be decelerated (for example, to zero or a minimum speed).

In this way, in response to a boost pressure overshoot, a speed of the first, upstream compressor is adjusted. In one example, adjusting the speed of the electric supercharger compressor includes an increase from zero speed (such as where the supercharger was disabled and the compressor is reactivated and spun from the zero speed to a speed corresponding to the choke flow). In an alternate example, the adjusting includes an increase from a minimum speed, where an amount of increase is based on a degree of the overshoot. In either case, the speed of the electric supercharger compressor is adjusted to limit the flow through the downstream compressor to a threshold airflow. Herein, the speed of the electric supercharger is adjusted by spinning an electric motor coupled to the supercharger compressor at a motor speed based on the airflow.

In one example, in response to a boost pressure overshoot while flowing compressed air via a downstream compressor, a controller may increase an opening of one or more of a wastegate valve across the exhaust turbine and a compressor recirculation valve coupled in a bypass across the downstream compressor. In comparison, in response to the boost pressure overshoot while flowing compressed air via the upstream compressor, the controller may maintaining each of the wastegate valve and the compressor recirculation valve closed. Alternatively, the opening of the wastegate valve and the CRV may be maintained, such as in a partially open position. Herein, the wastegate valve may be actuated with a higher than default gain tuning while flowing compressed air via the upstream compressor, and with the default gain tuning while flowing compressed air via the downstream compressor.

In this way, an upstream electrically actuated compressor may be accelerated during some conditions to increase airflow through a downstream compressor, while during other conditions, the electrically actuated compressor may be accelerated to decrease airflow through the downstream compressor. By using supercharger compressor speed and bypass valve adjustments in concert with wastegate adjustments, in complementary frequency bands, boost pressure overshoot downstream of the turbocharger compressor can be better managed and rapidly controlled. As such, this enables boost pressure to be controlled without degrading time to torque.

FIG. 4 shows an example compressor map 400 for an electric supercharger compressor. Compressor map 400 may be stored in the memory of a controller and used to identify a supercharger compressor speed required to provide a choked airflow into a downstream turbocharger compressor. The vertical axis (y-axis) of map 400 shows compressor pressure ratio, defined as the ratio of the air pressure at the electric supercharger compressor outlet over the ambient air pressure (barometric pressure). The horizontal axis (x-axis) shows the mass air flow rate through the electric supercharger, wherein the electric supercharger is staged upstream of a turbocharger. Line 402 (solid) shows a surge limit for the supercharger compressor. Operating the supercharger compressor under conditions to the left of this line may cause compressor surge, wherein flow through the supercharger compressor is choked. Solid lines 404 (only 2 are labeled) depict constant speed lines of the supercharger compressor. The direction of increasing compressor speed is depicted.

As described with reference to FIG. 3, in response to boost pressure overshoot at a downstream turbocharger compressor, an upstream electric supercharger compressor may be accelerated to a target compressor speed in order to choke airflow through the turbocharger compressor. This allows the throttle inlet pressure, and the boost pressure to be substantially immediately reduced. The electric supercharger operation creates an effective choke flow by limiting the airflow that may pass through the electric supercharger compressor at a given compressor speed and pressure ratio. The electric supercharger may control flow restriction to allow a specific volume of air to be boosted by the turbocharger, resulting in precise and substantially immediate control of the boost pressure.

In one example, based on the boost error, an engine controller may determine a desired airflow into the turbocharger compressor. Then, based on the manifold airflow, the controller may determine a corresponding pressure ratio across the upstream supercharger compressor. As such, the desired pressure ratio across the supercharger may correspond to a ratio of the pressure at the supercharger compressor inlet (which corresponds to the manifold airflow), relative to the pressure at the supercharger compressor outlet (which corresponds to the desired choke flow). Based on the desired pressure ratio, and the given manifold airflow, the controller may identify a corresponding compressor speed. The controller may then actuate the electric motor of the electric supercharger to spin the compressor at the determined compressor speed. In another example, the compressor map may be extrapolated to a pressure ratio less than 1. Choke flow may start to happen when the flow is at a constant speed line across the X axis (or pressure ratio=1). Then, an initial desired compressor speed can be looked up based on desired air mass flow. Feedback control can be added based on the current pressure ratio (<1) and the desired air mass flow. As one example, a compressor outlet pressure may be below ambient pressure (resulting in a pressure ratio outside the range of pressure ratios depicted in the ECU mapping of FIG. 4), such as at a time shortly after closing the ESBPV and while spinning up the electric supercharger. The controller may extrapolate the compressor map of FIG. 4 to the lower pressure ratio to estimate a desired compressor speed. As compressor speed increases, and likewise compressor pressure ratio increases, feedback control can be used to determine a desired compressor speed.

Figure 5:
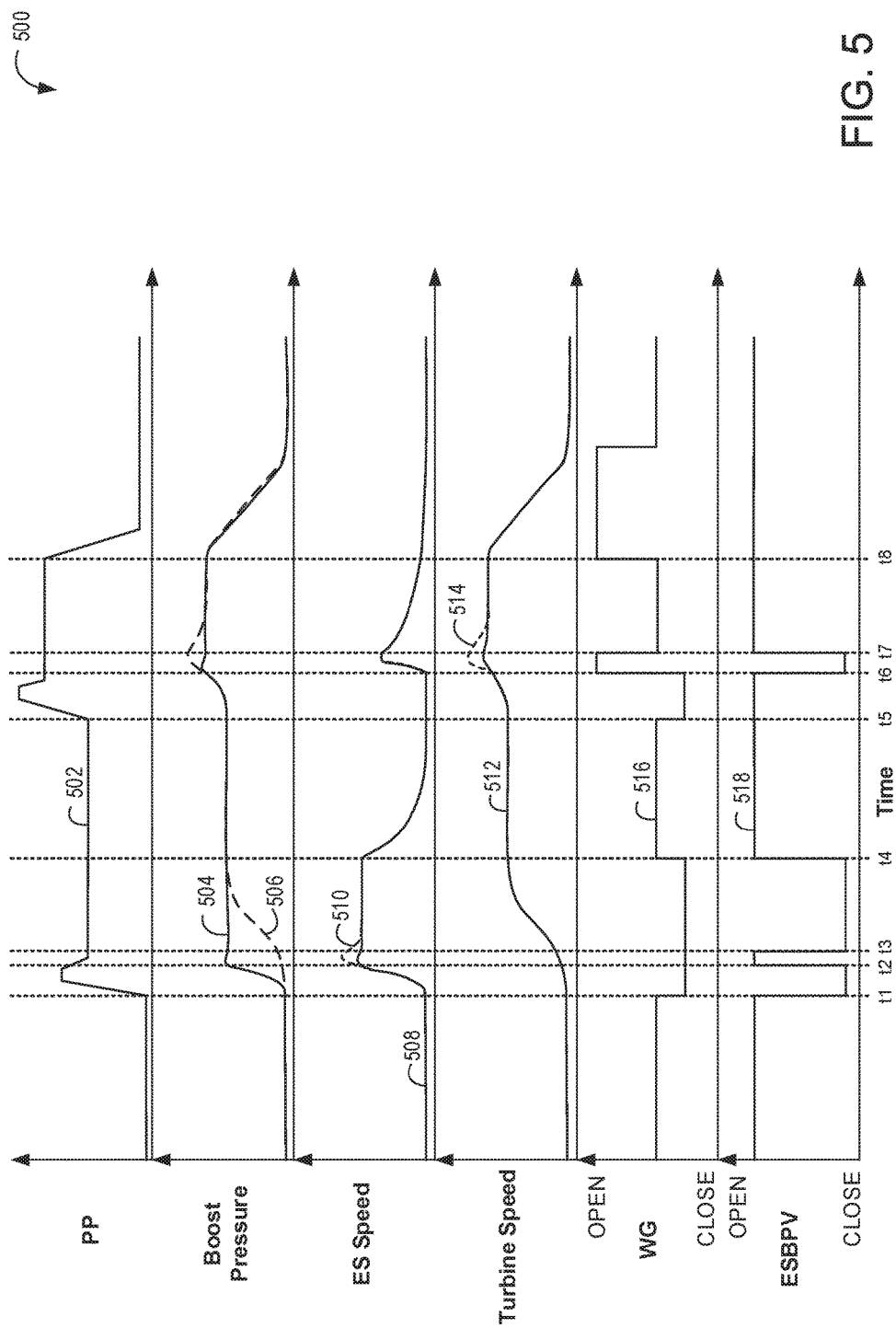
FIG. 5 shows sample adjustments that may be used to reduce ES overshoot and TC overshoot.

FIG. 5 shows an example sequence 500 illustrating boost pressure control by wastegate (WG) and ESBV actuation in coordination with electric supercharger speed control. The horizontal axis (x-axis) denotes time and the vertical markers t1-t8 identify significant times for boost pressure control. The first plot from the top shows variation in pedal position (line 502) over time. The second plot (line 504) shows variation in boost pressure over time. The third plot (line 508) shows variation of an electric supercharger compressor speed. The fourth plot (line 512) shows variation of a turbocharger turbine speed over time. The fifth plot (line 516) shows changes in wastegate opening over time. When opened, a wastegate allows exhaust gas to bypass the turbine of the turbocharger, thus decreasing the speed of the turbocharger turbine. The sixth plot (line 518) shows changes in the position of an electric supercharger bypass valve (ESBV) coupled across the electric supercharger. The ESBV is opened to allow intake air to bypass the electric supercharger or closed to direct air through the electric supercharger.

Prior to time t1, the engine is operating without boost, at a substantially constant speed. At time t1, the operator tips in from closed pedal, moving the engine from engine operation with natural aspiration to engine operation with boost, as seen from the increase in line 502. The engine boost pressure may be increased in response to the pedal tip-in event by actuating an electric motor to increase the electric supercharger speed. At the same time, the ESBV is closed to route more air through the supercharger compressor. At the same time, the wastegate opening is reduced to flow more exhaust through the turbocharger turbine and expedite turbine spin-up. By operating the smaller electric supercharger compressor in response to the pedal tip-in event, the boost pressure can be rapidly increased to meet the driver demand while the turbine spins up. As such, if the electric supercharger compressor were not spun, due to the delay in turbine spin-up, there may have been a turbo lag (delay in the actual boost pressure reaching the desired boost pressure), as depicted at dashed plot 506. In particular, by operating the electric supercharger, the desired boost pressure is provided by t2, in comparison to the turbo lag case where the desired boost pressure is provided around t4.

At time t2, while flowing compressed air to the engine via the electric supercharger, boost pressure may overshoot. In particular, the aggressive electric supercharger operation which reduces the turbo lag can also result in the actual boost pressure downstream of the supercharger compressor transiently exceeding the desired boost pressure. To address this boost pressure overshoot, the ESBPV is opened (fully opened in the depicted example) for a duration from t2 to t3, to direct airflow to the engine while bypassing the supercharger. Opening the ESBPV may decrease the amount of airflow passing through and being compressed by the supercharger compressor, thereby decreasing the boost pressure provided by the electric supercharger substantially immediately. Simultaneously, the electric supercharger speed is reduced to better match the desired boost pressure. Because adjusting the ESBV opening may result in a substantially immediate decrease in boost pressure during supercharger overshoot, the ESBV may be actuated with a higher than default gain tuning as the electric supercharger is accelerated (from time t1 to t2). Due to actuation of the ESBPV with higher than default gain tuning, the supercharger overshoot is reduced in degree and duration, as seen in line 508. As such, in the absence of ESBV adjustments, a larger and longer boost pressure overshoot may occur, as shown at dotted line 510. This longer and larger boost pressure overshoot could cause excess torque to be delivered, resulting in drivability issues.

At time t3, the electric supercharger overshoot has been reduced by ESBPV actuation, so the ESBPV is closed. In addition, since the turbine is still not sufficiently spun up, flowing of compressed air to the engine via the electric supercharger is resumed.

It will be appreciated that while the ESBV is depicted as an on/off valve movable between a fully open and a fully closed position, in an alternate example, the ESBV may be a variable valve whose position is adjustable to any position between and including the fully opened and fully closed positions. In such a case, the ESBV opening may be increase responsive to the boost pressure overshoot so that a specific amount of airflow may bypass the electric supercharger during overboost, such that a resultant boost pressure is equivalent to the desired boost pressure. The electric supercharger compressor speed may be adjusted to the desired compressor speed, responsive to boost error, and the ESBV opening may be adjusted to maintain the resultant boost pressure at the desired boost pressure.

At time t4, the turbocharger turbine speed reaches a desired turbine speed, at which it may provide the desired boost pressure without assistance from the electric supercharger. Once the turbine is sufficiently spun up, the wastegate opening may be adjusted with a higher gain tuning to maintain the boost pressure. In order to conserve electric supercharger battery charge, once the turbine is spun up, the ESBPV is opened, as seen in line 518, and the electric supercharger is decelerated, as seen in line 508. Thereafter, compressed air may be flowed into the engine to meet the driver boost demand via the turbocharger compressor.

At time t5, the operator tips in again from partial pedal depression, resulting in an engine transition from a lower boosted condition to a higher boosted condition. Responsive to the increase in boost demand, the turbocharger turbine speed is increased by decreasing the wastegate opening, the wastegate actuated at a higher than default gain tuning, as seen in line 516. Since the turbine is already spun-up at this time, the supercharger compressor may be maintained disabled.

At time t6, while flowing compressed air to the engine via the turbocharger, boost pressure may overshoot. In response to the overshoot, the wastegate opening is increased (e.g., the wastegate is fully opened) to decelerate the turbine, and reduce turbocharger output, as seen in line 516. To further expedite boost pressure reduction, the electric supercharger is accelerated to a target speed to choke airflow through the turbocharger compressor. In particular, the electric supercharger is accelerated to a speed that enables a target pressure ratio to be provided at the downstream turbocharger compressor. While accelerating the supercharger, the ESBV is closed to direct airflow through the supercharger compressor, the ESBV actuated with the default gain tuning. By choking airflow to the turbocharger compressor, the electric supercharger reduces the boost pressure more quickly. As such, in the absence of supercharger induced choke flow, due to the relatively slower wastegate dynamics, the turbine speed and the boost pressure may have reduced more slowly, as seen in dotted lines 506 and 514. The resulting over-torque delivery would have resulted in driveability issues.

At time t7, the boost error is reduced. Consequently, at t7, the ESBV is opened, as seen in line 518, and the electric supercharger is decelerated, as seen in line 508. The turbocharger compressor speed is maintained by reducing the wastegate opening, as seen in line 516. Thereafter, delivery of compressed air to the engine via the turbocharger compressor is resumed.

At time t8, the operator tips out, as seen in line 502. The turbocharger boost pressure and turbine speed are reduced to produce a desired boost pressure, as seen in lines 504 and 512, by opening the turbocharger wastegate, as seen in line 516. The wastegate is closed when the turbocharger boost pressure is equal to the desired boost pressure, as seen in line 516.

In this way, during a first boost pressure overshoot condition, a controller may increase the opening of a bypass valve coupled in a bypass across a first, upstream compressor; and during a second boost pressure overshoot condition, the controller may increase the opening of a wastegate valve coupled in a bypass across an exhaust turbine, the turbine driving a second, downstream compressor, wherein during both the first and second condition, the boost pressure overshoot is downstream of the second compressor. In one example, responsive to the first boost pressure overshoot condition, a flow of compressed air may be provided to the engine via the first compressor with the second compressor disabled, the first compressor driven by an electric motor, while during the second boost pressure overshoot condition, the flow of compressed air may be provided to the engine via the second compressor while bypassing the first compressor, the second compressor driven by an exhaust turbine. During the first boost pressure overshoot condition, turbine speed may be below a threshold speed, and airflow through the second compressor may be below a threshold flowrate, while during the second boost pressure overshoot condition, the turbine speed may be above the threshold speed, and the airflow through the second compressor is above the threshold flowrate (such as an idle airflow rate). Further, the controller may maintain a position of the exhaust wastegate valve during the first boost pressure overshoot condition, maintain a position of the bypass valve during the second boost pressure overshoot condition, and maintain an opening of an intake throttle during both the first and second boost pressure overshoot conditions. Herein, each of the first and second boost pressure overshoot conditions may include a boost error between actual boost pressure and desired boost pressure, wherein during the first boost pressure overshoot condition, the position of the bypass valve is based on the desired boost pressure, and each of a degree and a duration of the increasing the opening of the bypass valve is based on the boost error, while during the second condition, the position of the wastegate valve is based on the desired boost pressure, and a degree of increasing the opening of the wastegate valve is based on the boost error. The controller may also reduce a speed of the electric motor during the first boost pressure overshoot condition from a first motor speed based on desired boost pressure to a second motor speed based on the boost error. Increasing the opening of the bypass valve during the first boost pressure overshoot condition includes increasing the opening of the bypass valve until the boost error is reduced and then closing the bypass valve while continuing to accelerate the first compressor.

In this way, boost pressure is controlled more accurately and rapidly by coordinating adjustments to an electric supercharger speed and an associated bypass valve with adjustments to a wastegate valve.

The technical effect of coordinating adjustments to an electric supercharger staged upstream of a turbocharger with adjustments to an exhaust wastegate valve and an intake compressor recirculation valve is that boost pressure may be more precisely controlled. By relying on an electric supercharger bypass valve to reduce boost pressure overshoot, an electric supercharger may be operated more aggressively to reduce turbo lag while the downstream turbocharger spins up. By decelerating the supercharger while flow to the supercharger is bypassed via the bypass valve, the boost pressure may not be affected by delays associated with supercharger speed decay. By using the electric supercharger as a flow restrictor during conditions when the turbocharger is operational, boost pressure overshoot can be controlled rapidly, reducing driveability issues associated with excess torque delivery. By improving the time to torque, engine boost response is improved, including during a sudden operator change of mind event. Further, by coordinating the supercharger speed and bypass valve adjustments with throttle adjustments and in the complementary frequency band as wastegate adjustments, a wastegate control loop may be tuned more aggressively without degrading boost accuracy.

In one example, a method for a boosted engine, comprises, while a downstream compressor spins up, accelerating an upstream compressor with a bypass valve coupled in a bypass across the first compressor closed to provide a flow of compressed air to a piston engine, and, in response to a boost pressure overshoot, opening a bypass valve. In the preceding example, additionally or optionally, the downstream compressor is larger than the upstream compressor. The larger size of the downstream compressor results in greater inertia, boosting capability, etc. In any or all of the preceding examples, additionally or optionally, opening the bypass valve includes transiently opening the bypass valve from a fully closed position, each of a degree of opening of the bypass valve and a duration of opening of the bypass valve based on the boost pressure overshoot, the boost pressure overshoot occurring downstream of the downstream compressor, the boost pressure overshoot including actual boost pressure exceeding a desired boost pressure, and the method further comprises, maintaining an intake throttle open. In any or all of the preceding examples, additionally or optionally, one or more of the degree of opening of the bypass valve and the duration of opening of the bypass valve is increased as the actual boost pressure exceeds the desired boost pressure, the bypass valve closed when the actual boost pressure is at the desired boost pressure. In any or all of the preceding examples, additionally or optionally, the upstream compressor is accelerated via an electric motor and the downstream compressor is driven by an exhaust turbine, and accelerating the upstream compressor includes operating the electric motor at a motor speed based on the desired boost pressure. The upstream compressor, may be controlled by an electric motor that is decoupled from engine operation and can be controlled independently. In any or all of the preceding examples, additionally or optionally, the method further comprises in response to the boost pressure overshoot while flowing compressed air via the upstream compressor, the upstream compressor is decelerated by reducing the motor speed of the electric motor. In any or all of the preceding examples, additionally or optionally, the method further comprises, in response to a rotation speed of the exhaust turbine being higher than a threshold speed, decelerating the upstream compressor, opening the bypass valve, and flowing compressed air to the piston engine via the downstream compressor while bypassing the upstream compressor. In any or all of the preceding examples, additionally or optionally, the method further comprises, in response to a boost pressure overshoot while flowing compressed air via the downstream compressor, accelerating the upstream compressor with the bypass valve closed to limit airflow into the downstream compressor. In any or all of the preceding examples, additionally or optionally, the method further comprises, in response to the boost pressure overshoot while flowing compressed air via the downstream compressor, increasing an opening of one or more of the wastegate valve and a compressor recirculation valve coupled in a bypass across the downstream compressor, and in response to the boost pressure overshoot while flowing compressed air via the upstream compressor, maintaining each of the wastegate valve and the compressor recirculation valve closed. In any or all of the preceding examples, additionally or optionally, the wastegate valve is actuated with a higher than default gain tuning while flowing compressed air via the upstream compressor, and with the default gain tuning while flowing compressed air via the downstream compressor.

In another example, an engine method, comprises, during a first boost pressure overshoot condition, increasing opening of a bypass valve coupled in a bypass across a first, upstream compressor and, during a second boost pressure overshoot condition, increasing opening of a wastegate valve coupled in a bypass across an exhaust turbine, the turbine driving a second, downstream compressor, during both the first and second condition, the boost pressure overshoot is downstream of the second compressor. The preceding example method include, additionally or optionally, during the first boost pressure overshoot condition, provide a flow of compressed air to the engine via the first compressor with the second compressor disabled, the first compressor driven by an electric motor, and, during the second boost pressure overshoot condition, the flow of compressed air is provided to the engine via the second compressor while bypassing the first compressor, the second compressor driven by an exhaust turbine. In any or all of the preceding examples, additionally or optionally, during the first boost pressure overshoot condition, turbine speed is below a threshold speed, and airflow through the second compressor is below a threshold flowrate, and, during the second boost pressure overshoot condition, the turbine speed is above the threshold speed, and the airflow through the second compressor is above the threshold flowrate. In any or all of the preceding examples, additionally or optionally, the method further comprises, maintaining a position of the exhaust wastegate valve during the first boost pressure overshoot condition, maintaining a position of the bypass valve during the second boost pressure overshoot condition, and maintaining an opening of an intake throttle during both the first and second boost pressure overshoot conditions. In any or all of the preceding examples, additionally or optionally, each of the first and second boost pressure overshoot condition includes a boost error between actual boost pressure and desired boost pressure, during the first boost pressure overshoot condition, the position of the bypass valve is based on the desired boost pressure, and each of a degree and a duration of the increasing the opening of the bypass valve is based on the boost error, and, during the second condition, the position of the wastegate valve is based on the desired boost pressure, and a degree of increasing the opening of the wastegate valve is based on the boost error. In any or all of the preceding examples, additionally or optionally, the method further comprises reducing a speed of the electric motor during the first boost pressure overshoot condition from a first motor speed based on desired boost pressure to a second motor speed based on the boost error. In any or all of the preceding examples, additionally or optionally, increasing the opening of the bypass valve during the first boost pressure overshoot condition includes increasing the opening of the bypass valve until the boost error is reduced and then closing the bypass valve while continuing to accelerate the first compressor.

In yet another example, an engine system, comprises an engine having an intake, a first intake compressor driven by an electric motor, the motor powered by a battery a second intake compressor driven by an exhaust turbine, the second compressor positioned downstream of the first compressor along the intake, a bypass including a bypass valve coupled across the first compressor, a wastegate including a wastegate valve coupled across the exhaust turbine, and a controller with computer readable instructions stored on non-transitory memory for, in response to an operator pedal tip-in, flowing compressed air to the engine by operating the first compressor and each of the bypass valve and the wastegate valve closed until a turbine speed is higher than a threshold turbine speed, and, in response to a boost pressure overshoot while operating the first compressor, intermittently opening the bypass valve while maintaining the wastegate valve closed. The preceding example system may, additionally or optionally, include further instructions in the controller for flowing compressed air to the engine by operating the second compressor while bypassing the second compressor with the bypass valve closed and the wastegate valve partially open after the turbine speed is higher than the threshold turbine speed, and, in response to a boost pressure overshoot while operating the second compressor, intermittently increasing an opening of the wastegate valve while maintaining the bypass valve closed. In any or all of the preceding examples, additionally or optionally, the controller includes further instructions for actuating the wastegate valve with a higher than default tuning when the bypass valve is not degraded, and in response to an indication of bypass valve degradation, actuating the wastegate valve with the default tuning.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
while a downstream compressor spins up, accelerating an upstream compressor with a bypass valve, coupled in a bypass across the upstream compressor, closed to provide a flow of compressed air to a piston engine; and
in response to a boost pressure overshoot, opening the bypass valve.

2. The method of claim 1, wherein the downstream compressor is larger than the upstream compressor.

3. The method of claim 1, wherein opening the bypass valve includes transiently opening the bypass valve from a fully closed position, each of a degree of opening of the bypass valve and a duration of opening of the bypass valve based on the boost pressure overshoot, the boost pressure overshoot occurring downstream of the downstream compressor, the boost pressure overshoot including actual boost pressure exceeding a desired boost pressure, the method further comprising maintaining an intake throttle open.

4. The method of claim 3, wherein one or more of the degree of opening of the bypass valve and the duration of opening of the bypass valve is increased as the actual boost pressure exceeds the desired boost pressure, the bypass valve closed when the actual boost pressure is at the desired boost pressure.

5. The method of claim 3, wherein the upstream compressor is accelerated via an electric motor and the downstream compressor is driven by an exhaust turbine, and wherein accelerating the upstream compressor includes operating the electric motor at a motor speed based on the desired boost pressure.

6. The method of claim 5, further comprising, in response to the boost pressure overshoot while flowing compressed air via the upstream compressor, decelerating the upstream compressor by reducing the motor speed of the electric motor.

7. The method of claim 5, further comprising, in response to a rotation speed of the exhaust turbine being higher than a threshold speed, decelerating the upstream compressor, opening the bypass valve, and flowing compressed air to the piston engine via the downstream compressor while bypassing the upstream compressor.

8. The method of claim 7, further comprising, in response to a boost pressure overshoot while flowing compressed air via the downstream compressor, accelerating the upstream compressor with the bypass valve closed to limit airflow into the downstream compressor.

9. The method of claim 8, further comprising, in response to the boost pressure overshoot while flowing compressed air via the downstream compressor, increasing an opening of one or more of a wastegate valve and a compressor recirculation valve coupled in a bypass across the downstream compressor, and, in response to the boost pressure overshoot while flowing compressed air via the upstream compressor, maintaining each of the wastegate valve and the compressor recirculation valve closed.

10. The method of claim 9, wherein the wastegate valve is actuated with a higher than default gain tuning while flowing compressed air via the upstream compressor, and with the default gain tuning while flowing compressed air via the downstream compressor.

11. An engine method, comprising:
during a first boost pressure overshoot condition, increasing opening of a bypass valve coupled in a bypass across a first, upstream compressor; and
during a second boost pressure overshoot condition, increasing opening of a wastegate valve coupled in a bypass across an exhaust turbine, the turbine driving a second, downstream compressor, wherein during both the first and second conditions, the boost pressure overshoot is downstream of the second compressor.

12. The method of claim 11, wherein during the first boost pressure overshoot condition, a flow of compressed air is provided to an engine via the first compressor with the second compressor disabled, the first compressor driven by an electric motor, and wherein during the second boost pressure overshoot condition, the flow of compressed air is provided to the engine via the second compressor while bypassing the first compressor, the second compressor driven by the exhaust turbine.

13. The method of claim 12, wherein during the first boost pressure overshoot condition, a turbine speed is below a threshold speed, and airflow through the second compressor is below a threshold flowrate, and wherein during the second boost pressure overshoot condition, the turbine speed is above the threshold speed, and the airflow through the second compressor is above the threshold flowrate.

14. The method of claim 12, further comprising maintaining a position of the wastegate valve during the first boost pressure overshoot condition, maintaining a position of the bypass valve during the second boost pressure overshoot condition, and maintaining an opening of an intake throttle during both the first and second boost pressure overshoot conditions.

15. The method of claim 14, wherein each of the first and second boost pressure overshoot conditions includes a boost error between actual boost pressure and desired boost pressure, wherein during the first boost pressure overshoot condition, a position of the bypass valve is based on the desired boost pressure, and each of a degree and a duration of the increasing the opening of the bypass valve is based on the boost error, and wherein during the second condition, the position of the wastegate valve is based on the desired boost pressure, and a degree of increasing the opening of the wastegate valve is based on the boost error.

16. The method of claim 15, further comprising reducing a speed of the electric motor during the first boost pressure overshoot condition from a first motor speed based on the desired boost pressure to a second motor speed based on the boost error.

17. The method of claim 14, wherein increasing the opening of the bypass valve during the first boost pressure overshoot condition includes increasing the opening of the bypass valve until the boost error is reduced and then closing the bypass valve while continuing to accelerate the first compressor.

18. An engine system, comprising:
an engine having an intake;
a first intake compressor driven by an electric motor, the motor powered by a battery;
a second intake compressor driven by an exhaust turbine, the second compressor positioned downstream of the first compressor along the intake;
a bypass including a bypass valve coupled across the first compressor;
a wastegate including a wastegate valve coupled across the exhaust turbine; and
a controller with computer readable instructions stored on non-transitory memory for:
in response to an operator pedal tip-in,
flowing compressed air to the engine by operating the first compressor and each of the bypass valve and the wastegate valve closed until a turbine speed is higher than a threshold turbine speed; and
in response to a boost pressure overshoot while operating the first compressor, intermittently opening the bypass valve while maintaining the wastegate valve closed.

19. The system of claim 18, wherein the controller includes further instructions for:
flowing compressed air to the engine by operating the second compressor while bypassing the first compressor with the bypass valve closed and the wastegate valve partially open after the turbine speed is higher than the threshold turbine speed; and
in response to a boost pressure overshoot while operating the second compressor, intermittently increasing an opening of the wastegate valve while maintaining the bypass valve closed.

20. The system of claim 19, wherein the controller includes further instructions for actuating the wastegate valve with a higher than default tuning when the bypass valve is not degraded, and, in response to an indication of bypass valve degradation, actuating the wastegate valve with the default tuning.

* * * * *